United States Patent [19]

Fukushima et al.

[11] Patent Number: 4,865,347

[45] Date of Patent: Sep. 12, 1989

[54] ACTIVELY CONTROLLED SUSPENSION SYSTEM WITH ANTI-ROLL CONTROL

[75] Inventors: Naoto Fukushima; Yukio Fukunaga; Yohsuke Akatsu; Sunao Hano; Masaharu Satoh, all of Kanagawa, Japan

[73] Assignee: Nissan Motor Company, Limited, Yokohama, Japan

[21] Appl. No.: 169,201

[22] Filed: Mar. 16, 1988

[30] Foreign Application Priority Data

Mar. 16, 1987 [JP] Japan .................................. 62-60591

[51] Int. Cl.$^4$ ............................................ B60G 17/08
[52] U.S. Cl. ..................................... 280/707; 280/689
[58] Field of Search ............. 280/6 R, 6 H, 703, 707, 280/709, 714, 689, 840; 267/64.16; 188/299

[56] References Cited

U.S. PATENT DOCUMENTS

| | | | |
|---|---|---|---|
| 3,995,883 | 12/1976 | Glaze | 280/707 |
| 4,621,833 | 11/1986 | Soltis | 280/707 |
| 4,625,993 | 12/1986 | Williams et al. | 280/707 |
| 4,702,490 | 10/1987 | Yamaguchi et al. | 280/707 |
| 4,712,807 | 12/1987 | Kurosawa | 280/707 |
| 4,730,816 | 3/1988 | Erkert | 280/707 |

FOREIGN PATENT DOCUMENTS 0193124 9/1986 European Pat. Off. .

Primary Examiner—Richard A. Bertsch
Attorney, Agent, or Firm—Foley & Lardner, Schwartz, Jeffery, Schwaab, Mack, Blumenthal & Evans

[57] ABSTRACT

An actively controlled suspension system includes an anti-roll control loop which is responsive to lateral acceleration to be exerted on a vehicle, to adjust suspension characteristics. The control loop employed suspension system is variable of response characteristics to vehicular rolling depending upon the vehicle speed for varying anti-rolling suspension control characteristics. In a range of the vehicle speed, in which the greater loop gain of the control loop, causes significant and unacceptable level of self-induced lateral vibration, the gain is varied to be the smaller value than that in other vehicle speed range. Namely, since the greater gain may affect for causing self-induced lateral vibration in substantially low vehicle speed range, the gain may be adjusted to smaller value while vehicle speed is lower than a given value.

31 Claims, 10 Drawing Sheets

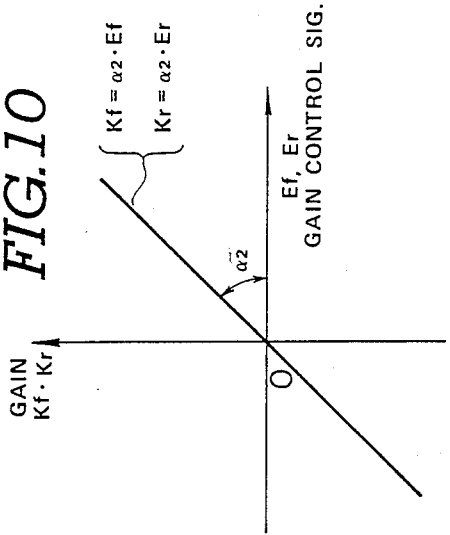
FIG.10
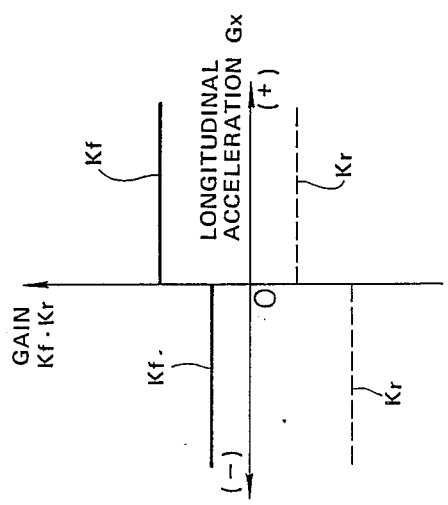
FIG.11
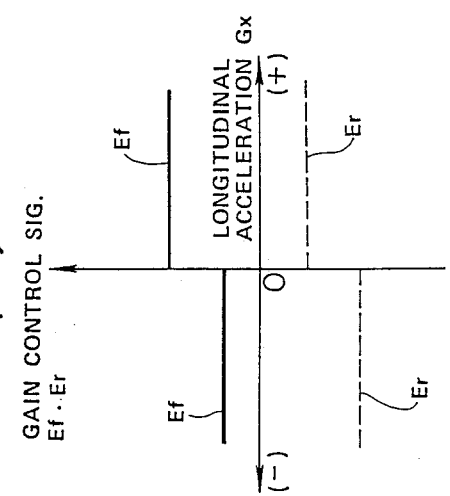

ACTIVELY CONTROLLED SUSPENSION SYSTEM WITH ANTI-ROLL CONTROL

BACKGROUND OF THE INVENTION

1. Field of the Invention

The present invention relates generally to an automotive suspension control system which actively controls suspension characteristics for adjusting vehicular attitude. More specifically, the invention relates to an actively controlled vehicular suspension system which features anti-roll control.

2. Description of the Background Art

The U.S. Pat. No. 4,702,490, issued on Oct. 27, 1987, to Hirotsugu YAMAGUCHI et al., and assigned to the common assignee to the present invention, discloses an actively or positively controlled automotive suspension system which includes hydraulic cylinder for generating variable damping force against relative motion of a vehicular suspension member and a vehicle body in bounding and rebounding directions for adjusting suspension characteristics and adjusting vehicle body attitude.

Similar type actively controlled suspension systems has been disclosed in the co-pending U.S. patent application Ser. No. 060,911, filed on June 12, 1987 and assigned to the common assignee to the present invention. Further, European Patent First Publication Nos. 02 49 246 and 02 49 209 respectively corresponding to co-pending U.S. patent applications Ser. Nos. 061,368 (filed on June 15, 1987) and 059,888, filed on June 9, 1987, both of which have been assigned to the common assignee to the present invention. The later-mentioned three inventions includes features of anti-roll suspension control for adjusting damping characteristics at respective vehicular wheel for suppressing vehicular rolling motion.

Generally, anti-roll suspension control in this type of actively controlled suspension system, is performed in terms of lateral acceleration to be exerted on the vehicle body. In order to satisfactorily suppress vehicular rolling, it is required to provide sufficient gain for a lateral acceleration dependent control loop. However, on the other hand, greater gain in the control loop tends to increase magnitude of self-induced vibration in rolling direction. Therefore, for minimizing or maintaining the self-induced vibration magnitude within an acceptable level, the gain of the control loop has to be limited. The limited loop gain in the control loop tends to make anti-roll characteristics of the suspension system unsatisfactory.

On the other hand, it is noted by the inventor of the present invention that uncomfortable self-induced vibration tends to occur at substantially low vehicle speed range. It is also found that magnitude of self-induced vibration becomes smaller or self-induced vibration will not affect for riding comfort at higher vehicle speed.

SUMMARY OF THE INVENTION

Therefore, it is an object of the invention to provide an actively controlled suspension system which is variable of control characteristics depending upon the vehicle speed.

Another object of the invention is to provide a variable anti-roll control characteristics depending upon the vehicle speed.

In order to accomplish the aforementioned and other objects, an actively controlled suspension system, according to the invention, includes an anti-roll control loop which is responsive to lateral acceleration to be exerted on a vehicle, to adjust suspension characteristics. The control loop employed in the present invention is variable of gain depending upon the vehicle speed for varying anti-rolling suspension control characteristics.

In the practical control, in a range of the vehicle speed, in which the greater loop gain of the control loop, causes significant and unacceptable level of self-induced lateral vibration, the gain is varied to be the smaller value than that in other vehicle speed range. Namely, since the greater gain may affect for causing self-induced lateral vibration in substantially low vehicle speed range, the gain may be adjusted to smaller value while vehicle speed is lower than a given value.

According to one aspect of the invention, an anti-roll suspension control system for an automotive vehicle comprises a suspension system disposed between a vehicle body and a suspension member which rotatably supports a vehicular wheel, the suspension system having a variable pressure chamber filled with a working fluid of controlled pressure, a pressure adjusting means, associated with the variable pressure chamber, for adjusting the pressure of the working fluid in the pressure chamber, a first sensor means for monitoring the vehicle speed to producing a vehicle speed indicative signal indicative of the vehicle speed; a second sensor means for monitoring vehicular rolling condition for producing a rolling magnitude indicative signal, and a control unit receiving the vehicle speed indicative signal and the rolling magnitude indicative signal, producing an anti-roll suspension control signal based on the rolling magnitude indicative signal to control the pressure adjusting means for adjusting suspension characteristics to suppress vehicular rolling, the control unit adjusting response characteristics of anti-roll suspension control in response to the rolling magnitude indicative signal depending upon the vehicle speed indicative signal value.

According to another aspect of the invention, an anti-roll suspension control system for an automotive vehicle comprises at least first-left and second-right suspension systems, each being disposed between a vehicle body and a suspension member which rotatably supports a vehicular wheel, each of the suspension system having a variable pressure chamber filled with a working fluid of controlled pressure, a pressure adjusting means, associated with the variable pressure chambers, for adjusting the pressure of the working fluid in the pressure chambers in a manner mutually independent to the other, a first sensor means for monitoring the vehicle speed to producing a vehicle speed indicative signal indicative of the vehicle speed, a second sensor means for monitoring vehicular rolling condition for producing a rolling magnitude indicative signal, and a control unit receiving the vehicle speed indicative signal and the rolling magnitude indicative signal, producing first and second anti-roll suspension control signals based on the rolling magnitude indicative signal to control the pressure adjusting means for adjusting suspension characteristics in the first and second suspension systems to suppress vehicular rolling, the control unit adjusting response characteristics of anti-roll suspension control in response to the rolling magnitude indicative signal depending upon the vehicle speed indicative signal value.

According to a further object of the invention, an actively controlled suspension system for an automotive vehicle comprises a suspension system disposed between a vehicle body and a suspension member which rotatably supports a vehicular wheel, the suspension system having a variable pressure chamber filled with a working fluid of controlled pressure, a pressure adjusting means, associated with the variable pressure chamber, for adjusting the pressure of the working fluid in the pressure chamber, a first sensor means for monitoring magnitude of relative displacement between the vehicle body and the suspension member to produce a bouncing magnitude indicative signal, a second sensor means for monitoring vehicular rolling condition for producing a rolling magnitude indicative signal, a third sensor means for monitoring the vehicle speed to producing a vehicle speed indicative signal indicative of the vehicle speed and a control unit receiving the bouncing magnitude indicative signal, the rolling magnitude indicative signal and the vehicle speed indicative signal, producing a suspension control signal based on the bouncing magnitude indicative signal value to control the pressure adjusting means for adjusting suspension characteristics to suppress relative displacement between the vehicle body and the suspension member, the control unit being responsive to rolling magnitude indicative signal to modify the suspension control signal for suppressing vehicular rolling, the control unit adjusting response characteristics of anti-roll suspension control in response to the rolling magnitude indicative signal depending upon the vehicle speed indicative signal value.

The control unit detects the vehicle speed indicative signal value smaller than a given value to lower the response characteristics. The control unit maintains the response characteristics at a give constant first level while the vehicle speed indicative signal value is held greater than or equal to the give value. The control unit is responsive to vary the response characteristics between the first level and zero level according to the vehicle speed indicative signal value while the vehicle speed indicative signal value is held lower than the given value. The control unit is set the given value at a value representative of substantially low vehicle speed.

The pressure adjusting means comprises a pressurized fluid source connected to the variable pressure chamber and a pressure control valve incorporating an electrically operable actuator, the actuator being connected to the control unit to receive the anti-roll suspension control signal to operate the pressure control valve for adjusting amount of working fluid to be introduced into and removed from the variable pressure chamber for adjusting damping characteristics of the suspension system. The control unit includes a gain-controlled amplifier which determines the response characteristics, the control unit adjusts the gain of the gain-controlled amplifier corresponding to the vehicle speed indicative signal value. The control unit compares the vehicle speed indicative signal value with a predetermined low vehicle speed criterion to maintain the gain of the gain-controlled amplifier at a constant first value when the vehicle speed indicative signal value is greater than or equal to the low vehicle speed criterion, and lowers the gain corresponding to the vehicle speed indicative signal value which is smaller than the low vehicle speed criterion.

The control unit varies the gain of the gain-controlled amplifier in a range between the first value and zero value depending upon the vehicle speed indicative signal value. The control unit varies the gain of the gain-controlled amplifier linearly corresponding to the vehicle speed indicative signal value.

BRIEF DESCRIPTION OF THE DRAWINGS

In the drawings:

FIG. 10 is a graph showing relationship of gain control signals $E_f$ and $E_r$ and gain $K_f$ and $K_r$ in gain-controlled amplifiers which are cooperative to each other for adjusting pitching suppressive suspension control characteristics, employed in the suspension control system of FIG. 6;

FIGS. 11(a) and 11(b) are graphs showing relationship between longitudinal acceleration $G_x$ and gains $E_f$ and $E_r$;

DESCRIPTION OF THE PREFERRED EMBODIMENT

Figure 1:
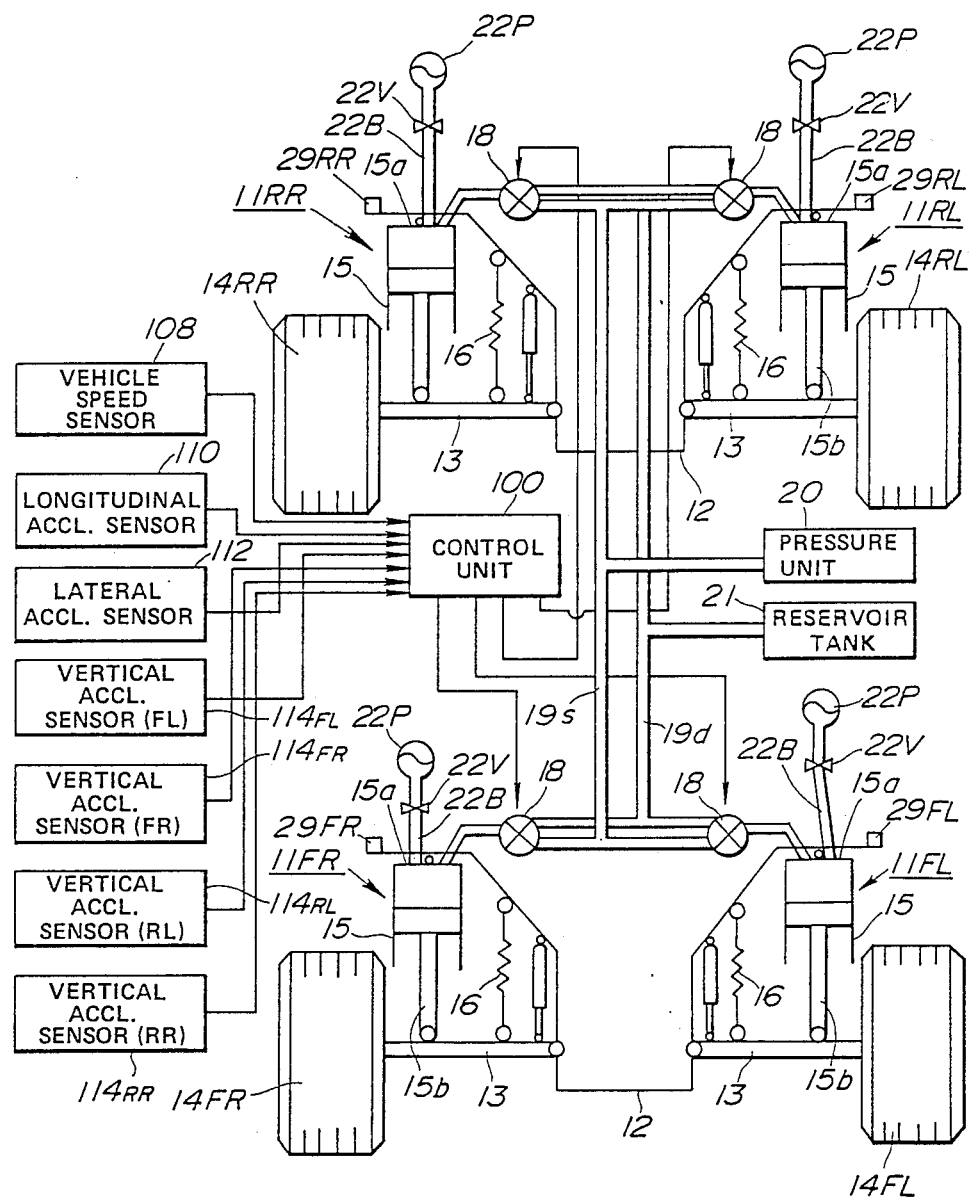
FIG. 1 is a schematic illustration of general construction of an actively controlled suspension system.

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator for generating damping force against bounding and rebounding motion between the vehicle body and the suspension member, and a coil spring 16.

It should be appreciated that, in the shown embodiment, the coil spring 16 is not necessary to damp dynamic kinematic energy and should resiliently support only static load to be exerted between the vehicle body and the suspension member. However, it should be, of course, possible to employ the coil spring which can be strong enough to damp part of dynamic kinematic energy in relative bounding and rebounding motion of the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one of the vehicle body 12 and the suspension member 13. On the other hand, the end of the piston rod 15b is connected to the other of the vehicle body 12 and the suspension member 13.

The hydraulic cylinder 15A of the suspension assembly 15 is connected to a hydraulic pressure source unit 20 via a hydraulic circuit which includes pressure control valve 18. The pressure control valve 18 is electrically operable and connected to a microprocessor-based control unit 100. The hydraulic circuit 19 includes a supply line 19s and a drain line 19d. The pressure source unit generally comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto As seen from FIG. 1, a pressure accumulators 22P are communicated with the upper fluid chamber 15d of the hydraulic cylinder 15A via a pressure line 22B. A throttle valve 22V is inserted between the upper fluid chamber 15d and the pressure accumulator 22P. In the shown embodiment, the throttle valve 22V has a fixed throttling rate.

Figure 2:
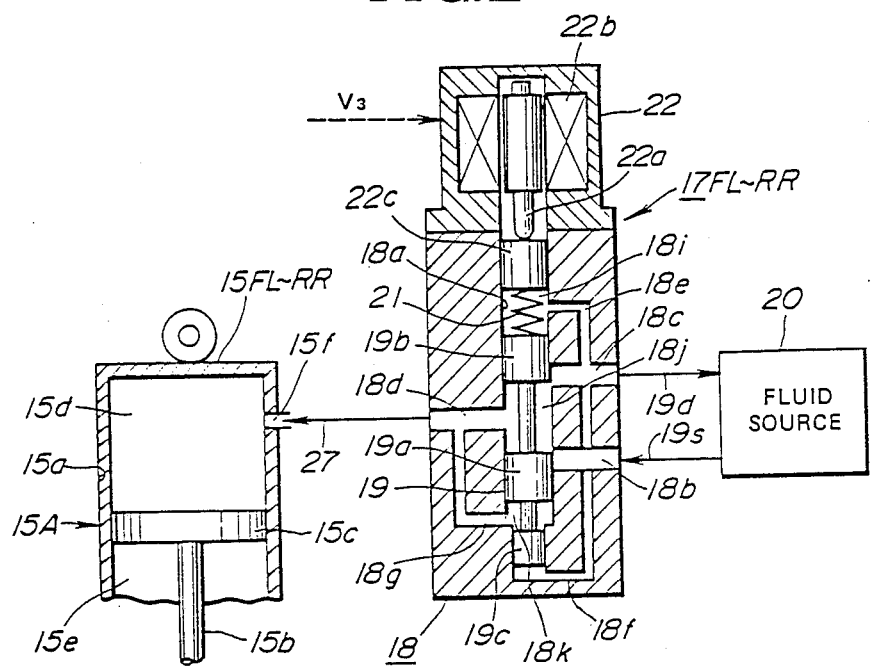
FIG. 2 is a sectional view of a pressure control valve assembly to be employed in the preferred embodiment of the actively controlled suspension system according to the invention.

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. Though FIG. 2 does not show clear construction, the lower fluid chamber 15e is defined as an enclosed space and is filled with the viscous working fluid. The pressure of the working fluid in the lower fluid chamber 15e at an initial position of the piston 15c serves as a reference pressure and per se serves as resistance for downward movement of the piston.

The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and whereby communicated with the upper fluid chamber 15d. On the other hand, the pressure chamber 18j shifts according to shifting of the valve spool 19 to selectively communicate with the inlet port 18b and the drain port 18c. On the other hand, an pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The actuator piston 22c contacts with an actuator rod 22a of an electrically operable actuator 22 which comprises an electromagnetic solenoid. The solenoid 22 comprises a proportioning solenoid.

Figure 3:
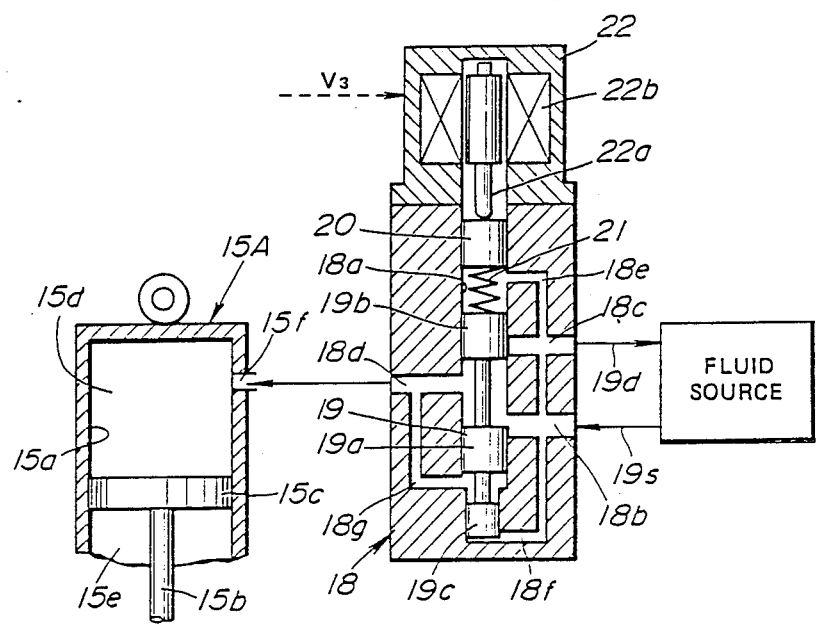
FIGS. 3(a) and 3(b) are sectional view similar to FIG. 2, but showing the condition where a piston in the pressure control valve assembly is shifted downwardly for reducing fluid pressure in a fluid chamber of a hydraulic cylinder in the suspension system and upwardly to increase the fluid pressure in the fluid chamber.
Figure 3:
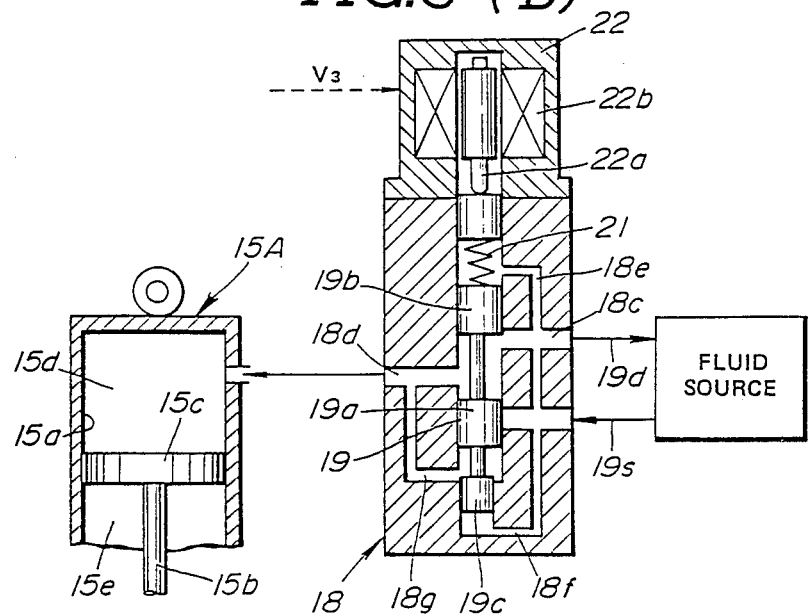

In order to increase the supply pressure of the working fluid, the spool valve 19 is shifted to the position shown in FIG. 3(A) to increase path area at a throttle constituted at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the drain port 18 which is normally blocked by means of the land 19b of the spool valve.

Construction of the pressure control valves should not be specified to the construction as illustrated in FIGS. 2, 3(A) and 3(B) but can be replaced with any appropriate constructions. For example, the pressure control valve constructions as illustrated in European Patent First Publication No. 01 93 124, set forth above, can also be employed. The disclosure of the aforementioned European Patent First Publication No. 01 93 124 is herein incorporated by reference for the sake of disclosure.

Figure 4:
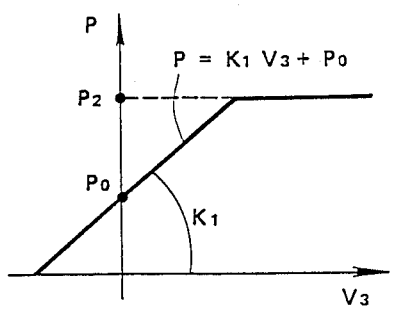
FIG. 4 is a graph showing variation of the fluid pressure in a hydraulic cylinder as controlled by the pressure control, valve assembly of FIG. 2.

As seen from FIG. 2, the proportioning solenoid 22 comprises the actuator rod 22a and a solenoid coil 22b. The solenoid coil 22b is energized by suspension control signal $V_3$ from the controller 100. In the shown embodiment of the pressure control valve, the working fluid pressure p at the outlet port 18d is variable according to the characteristics shown in FIG. 4. Namely, when the control valve $V_3$ as represented by the suspension control signal is zero, the pressure at the outlet port 18 becomes $P_0$ determined according to a predetermined offset pressure $P_0$. When the suspension control signal value in positive value increases, the fluid pressure P at the outlet port 18d increases with a predetermined proportioning gain $K_1$. Namely, by increasing of the suspension control value $V_3$, the actuator rod 22a is driven downwardly in FIG. 2 at a magnitude toward to position of FIG. 3(A) to achieve increasing of the fluid pressure with the predetermined proportioning gain $K_1$. The fluid pressure P at the outlet port 18d saturate at the output pressure $P_2$ of the pressure unit 20. On the other hand, when the suspension control signal value $V_3$ decreases, the pressure P decreases to zero to by shifting of the actuator rod 22a toward the direction to FIG. 3(B).

The actuator rod 22a of the proportioning solenoid 22 is associated with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 2. The valve spool 19 also receives upward hydraulic force from the pressure control chamber 18k. Therefore, the valve spool 19 is oriented at the position in the valve bore at the position where the downward bias of the bias spring 22d balances with the upward hydraulic force of the pressure control chamber 18k.

When bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 22d and the upward hydraulic force of the pressure control chamber 18k. This causes upward movement of the valve spool 19 against the spring force of the bias spring 22d, as shown in FIG. 3(B). As a result, path area of the drain port 18c increases and the inlet port 18b becomes being blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body.

When rebounding motion occurs at the suspension member, the piston 15c of the hydraulic cylinder 15A shifts downwardly to cause decreasing of the fluid pressure in the upper chamber 15d. This causes decreasing of the fluid pressure at the outlet port 18d of the pressure control valve 18. As a result, the fluid pressure in the pressure control chamber 18k decreases by the pressure introduced through the pilot path 18g to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result, path area of the inlet port 18b increases and the drain port 18c becomes being blocked. Therefore, the fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Here, since no flow resisting element, such as orifice, throttling valve, is disposed between the fluid reservoir 21 and the drain port 18c, no damping force against the upward motion of the piston 15c in the hydraulic cylinder 15A will be produced in response to the bounding motion of the suspension member. Since the damping force exerted on the piston 15c may serves to allow transmission of the part of bounding energy to the vehicle body to cause rough ride feeling, the shown embodiment of the suspension system may provide satisfactorily high level riding comfort by completely absorbing the bounding and rebounding energy set forth above.

Figure 5:
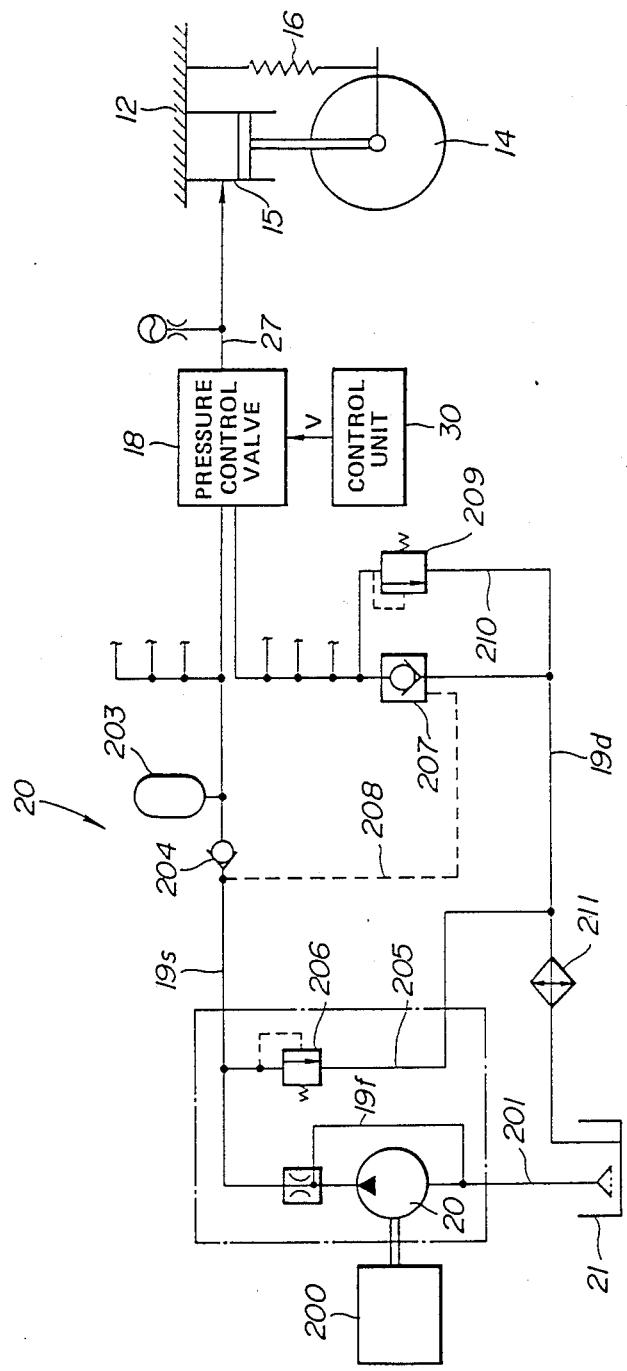
FIG. 5 is a schematical and diagramatical illustration of a hydraulic circuit to be employed for the preferred embodiment of the line pressure control of the invention.

FIG. 5 shows detailed circuit construction of the preferred embodiment of the pressure source unit to be employed in the suspension control system according to the invention. As set forth, the pressure source unit includes the pressure unit 20 which comprises a fluid pump, and is connected to the reservoir 21 via a suction pipe 201 which is driven by means of an automotive engine 200. The outlet of the pressure unit 20, through which the pressurized working fluid is fed, is connected to the inlet port 18b of the pressure control valve 18 via the supply line 19s. A pressure regulating orifice 202 is disposed in the supply line 19s for suppressing pulsatile flow of the working fluid and whereby regulate the output pressure of the pressure unit 20 to be delivered to the pressure control valve 18. A feedback line 19f is connected to the upstream of the pressure regulating orifice 202 at one end. The other end of the feedback line 19f is connected to the upstream of the inlet of the pressure unit 20. Therefore, excessive fluid between the pressure unit 20 and the orifice 202 is fed back to the inlet side of the pressure unit.

A pressure accumulator 203 is also connected to the supply line 19s to receive therefrom the pressurized fluid for accumulating the pressure. An one-way check valve 204 is disposed in the supply line 19s at the position upstream of the junction between the pressure accumulator 203 and the supply line 19s.

A pressure relief line 205 is also connected to the supply line 19s at the position intermediate between the pressure regulating orifice 202 and the one-way check valve 204, at one end. The other end of the pressure relief line 205 is connected to the drain line 19d. A pressure relief valve 206 is disposed in the pressure relief line 205. The pressure relief valve 206 is responsive to the fluid pressure in the supply line 19s higher than a give value to drain part of the working fluid to the drain line for maintaining the pressure in the supply line 19s below the given pressure value.

On the other hand, a shut-off valve 207 is disposed in the drain line 19d. The shut-off valve 207 is also connected to the supply line 19s at upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 19d may flow therethrough to the reservoir tank 21. On the other hand, the shut-off valve 207 is responsive to pilot pressure drops below the given pressure level to be switched into shut-off position. At the shut-off position, the shut-off valve blocks fluid communication between the drain port 18c and the reservoir tank 21.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 19d upstream thereof, higher than a set pressure, e.g. 30 kgf/cm , in order to establish fluid communication between the upstream side and downstream side of the shut-off valve to allow the excessive pressure at the upstream side drain line 19d to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 19d for cooling the working fluid returning to the reservoir tank 21.

Pressurized fluid supply operation to be taken place by the pressure source unit as set forth above will be discussed herebelow.

While the automotive engine 200 is running, the fluid pump as the pressure unit 20 is driven. Therefore, the working fluid in the reservoir tank 21 is sucked via the suction pipe 201 and pressurized through the pressure unit 20. The pressurized working fluid is discharged from the outlet of the pressure unit 20 and fed to the pressure control valve 18 via the supply line 19s including the pressure regulating orifice 202 and the one-way check valve 204. When the pressure control valve 18 in a position of FIG. 3(A), the pressurized working fluid passes the pressure control valve and introduced into the upper fluid chamber 15d of the hydraulic cylinder 15. On the other hand, when the pressure control valve 18 is in the position of FIG. 3(B) to block communication between the supply line 19s and the upper fluid chamber 15d, the line pressure in the supply line increases. When the line pressure in the supply line 19s becomes higher than a set pressure of the pressure relief valve 206 in the pressure relief line 205, the excessive pressure higher than the set pressure is fed to the drain line 19d via the pressure relief valve 206 and thus returned to the reservoir tank 21.

The fluid pressure in the supply line 19s is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 18 and the reservoir tank 21 is maintained. When the pressure control valve 18 is in the position of FIG. 3(B), the working fluid is thus returned to the reservoir tank 21 via the drain line 19d via the shut-off valve 207 and the oil cooler 211.

Since the shut-off valve 207, even at the open position, serves as a resistance to the fluid flow. Therefore, the fluid pressure in the drain line 19d upstream of the shut-off valve 207 becomes excessively higher, i.e. higher than the off-set pressure $P_0$. Then, the pressure relief valve 209 becomes active to open for allowing the excessive pressure of the working fluid to flow through the by-pass line 210.

When the engine 200 stops, the pressure unit 20 cease operation. By stopping of the pressure unit 20, the working fluid pressure in the supply line 19s drops. According to drop of the pressure in the supply line 19s, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 19d upstream of the shut-off valve 207 becomes equal to the pressure in the upper fluid chamber 15d. Therefore, even when the working fluid leaks through a gap between the spool valve 19 and the inner periphery of the valve bore 18a, it will not affect the fluid pressure in the upper fluid chamber 15d.

This is advantageous to maintain the suspension characteristics of the suspension systems irrespective of the engine driving condition.

Figure 6:
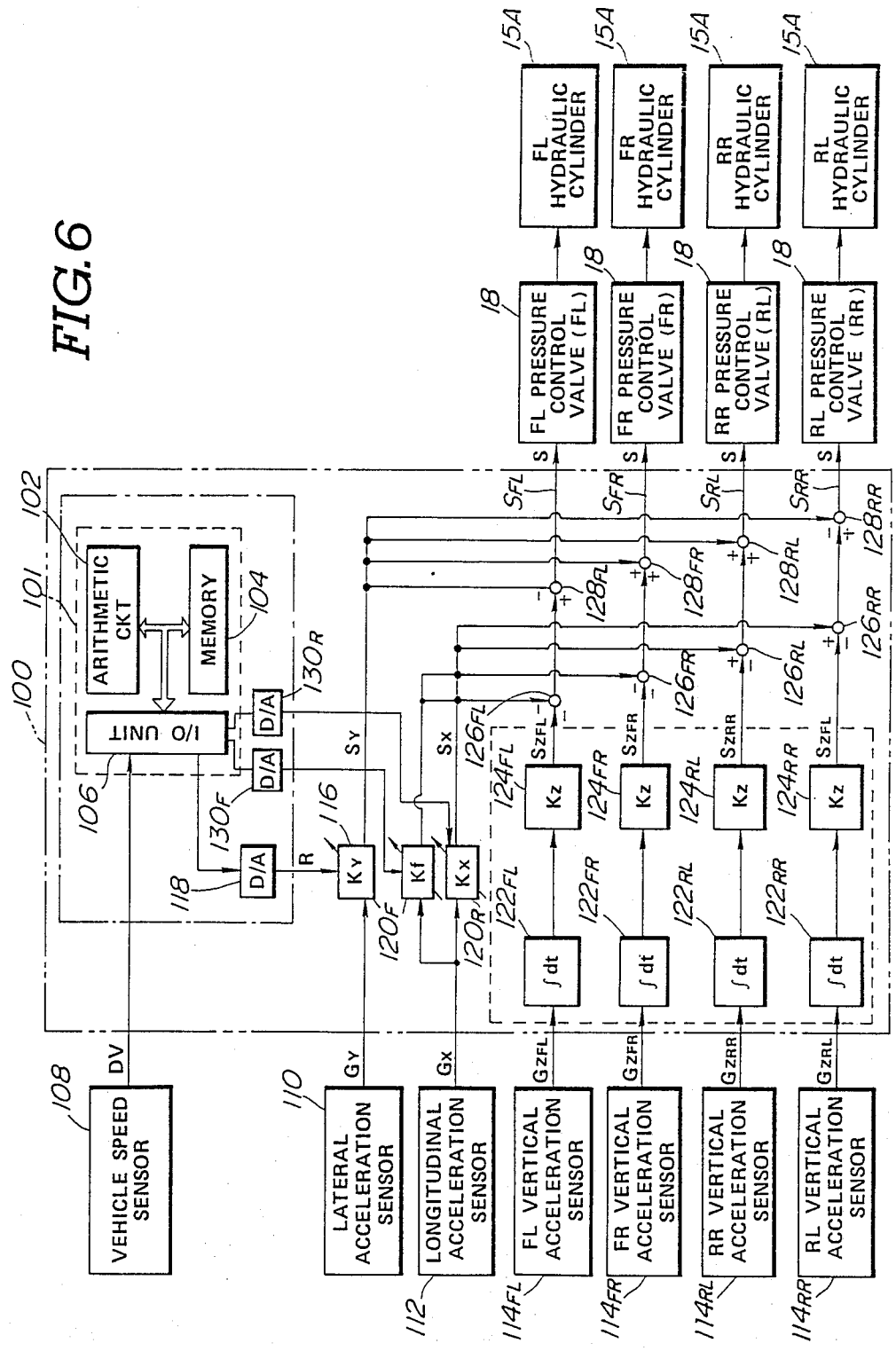
FIG. 6 is a schematic block diagram of the preferred embodiment of suspension control system of FIG. 1.

In order to perform control for adjusting suspension characteristics depending upon the vehicle driving condition, the microprocessor-based control unit 100 is provided. The suspension control system including the control unit 100 is illustrated in FIG. 6. The control unit 100, illustrated in FIG. 6, includes a microprocessor 101 which comprises an arithmetic circuit 102, a memory 104 and input/output unit 106. A vehicle speed sensor 108 is provided for monitoring the vehicle speed to produce a vehicle speed indicative signal DV. The vehicle speed sensor 108 employed in the shown embodiment of the suspension control system, is designed to produce a pulse train having a frequency proportional to the vehicle speed as the vehicle speed indicative signal DV. A lateral acceleration sensor 110 is also provided for monitoring lateral acceleration to be exerted on the vehicle to produce a lateral acceleration indicative signal Gy. The control system also includes a longitudinal acceleration sensor 112 for monitoring longitudinal acceleration exerted on the vehicle for producing a longitudinal acceleration indicative signal Gx. Furthermore, vertical acceleration sensors 114FL, 114FR, 114RL and 114RR are provided for monitoring vertical acceleration at respective front-left, front-right, rear-left and rear-right suspension systems 11FL, 11FR, 11RL and 11RR to produce vertical acceleration indicative signals. Hereafter, the acceleration sensor 114FL monitoring vertical acceleration at the front-left suspension system 11FL will be referred to as "FL vertical acceleration sensor". Similarly, the acceleration sensor 114FR monitoring vertical acceleration at the front-right suspension system 11FR will be referred to as "FR vertical acceleration sensor"; the acceleration sensor 114RL monitoring vertical acceleration at the rear-left suspension system 11RL will be referred to as "RL vertical acceleration sensor"; and the acceleration sensor 114RR monitoring vertical acceleration at the rear-right suspension system 11RR will be referred to as "RR vertical acceleration sensor". The vertical acceleration indicative signals produced by respective FL, FR, RL and RR vertical acceleration sensors 114FL, 114FR, 114RL and 114RR will be hereafter referred to respectively as "FL vertical acceleration indicative signal $Gz_{FL}$", "FR vertical acceleration indicative signal $Gz_{FR}$", "RL vertical acceleration indicative signal $Gz_{RL}$" and "RR vertical acceleration indicative signal $Gz_{RR}$".

The vertical acceleration sensors 114FL, 114FR, 114RL and 114RR may, in practice, comprise a strain gauge or piezoelectric sensor mounted at the top end portion of the suspension struts at respective front-left, front-right, rear-left and rear-right wheels. The practical construction of the vertical acceleration sensor has been disclosed in the co-pending U.S. patent application Ser. No. 120.964, filed on Nov. 16, 1987. The disclosure of the above-identified U.S. patent application Ser. No. 120,964 is herein incorporated by reference for the sake of disclosure.

The lateral acceleration sensor 110 is connected to a gain-controlled amplifier 116. The gain controlled amplifier 116 is also connected to the input/output unit 106 of the microprocessor 101 via a digital-to-analog (D/A) converter 118 to receive therefrom a gain control signal R. The longitudinal acceleration sensor 112 is connected to gain-controlled amplifiers 120F and 120R.

Respective FL, FR, RL and RR vertical acceleration sensors 114FL, 114FR, 114RL and 114RR are connected to integrators 122FL, 122FR, 122RL and 122RR. Each of the integrators 122FL, 122FR, 122RL and 122RR integrates corresponding one of the FL vertical acceleration indicative signal $Gz_{FL}$, FR vertical acceleration indicative signal $Gz_{FR}$, RL vertical acceleration indicative signal $Gz_{RL}$ and RR vertical acceleration indicative signal $Gz_{RR}$. The integrators 122FL, 122FR, 122RL and 122RR are connected to amplifiers 124FL, 124FR, 124RL and 124RR which has fixed gain The amplifiers 124FL, 124FR, 124RL and 124RR are connected to inverted input terminal of adders 126FL, 126FR, 126RL and 126RR. The adders 126FL and 126FR have another inverted input terminals connected to the amplifiers 120F and 120R. On the other hand, the adders 126RL and 126RR have non-inverted input terminals connected to the amplifier 120. The outputs of the adders 126FL, 126FR, 126RL and 126RR are connected to non-inverting input terminals of another adders 128FL, 128FR, 128RL and 128RR. The adders 128FL and 128RR have inverting input terminals connected to the gain-controlled amplifier 116. On the other hand, the adders 128FR and 128RL have to the non-inverting input terminals connected to the gain-controlled amplifier 116. The output terminals of the adders 128FL, 128FR, 128RL and 128RR are connected to the proportioning solenoids 22 in the pressure control valves 18. Therefore, the solenoids 22 adjusts the position of the pistons 15c and whereby adjust the pressure in the upper fluid chambers 15d of respective hydraulic cylinders 15A in respective suspension systems 11FL, 11FR, 11RL and 11RR according to the outputs of the adders 128FL, 128FR, 128RL and 128RR serving as the suspension control signals $S_{FL}$, $S_{FR}$, $S_{RL}$ and $S_{RR}$. The control signals output from the adder 128FL will be hereafter referred to as "FL control signal $S_{FL}$"; the control signals output from the adder 128FR will be hereafter referred to as "FR control signal $S_{FR}$"; the control signals output from the adder 128RL will be hereafter referred to as "RL control signal $S_{RL}$"; the control signals output from the adder 128RR will be hereafter referred to as "RR control signal $S_{RR}$".

As will be appreciated, the vertical acceleration indicative signals $Gz_{FL}$, $Gz_{FR}$, $Gz_{RL}$ and $Gz_{RR}$ are utilized for bounding control, in which relative displacement of the vehicle body and the suspension members is monitored. Suspension characteristics at respective front-left, front-right, rear-left and rear-right suspension system are adjusted for suppressing bouncing. For this purpose, the integrators 122FL, 122FR, 122RL and 122RR integrates the values of vertical acceleration indicative signals from respectively corresponding vertical acceleration sensors 114FL, 114FR, 114RL and 114RR to output the values representative of relative displacement of the vehicle body and suspension members in bounding and rebounding direction from a predetermined initial position.

The lateral acceleration sensor 110, the gain-controlled amplifier 116 and the adders 128FL, 128FR, 128RL and 128RR introduces the rolling suppressive factor in the suspension control signals $S_{FL}$, $S_{FR}$, $S_{RL}$ and $S_{RR}$. Namely, in general, the gain-controlled amplifier 116, the front-left and rear-right suspension systems are controlled in opposite to that in the front-right and rear left suspension systems for suppressing vehicular rolling.

Figure 7:
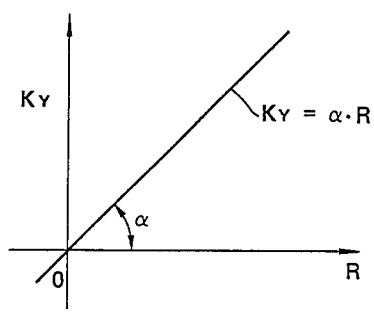
FIG. 7 is a graph showing relationship between gain control signal R and a gain $K_y$ in a gain-controlled amplifier which adjusts roll suppressive suspension control characteristics, employed in the suspension control system of FIG. 6.
Figure 8:
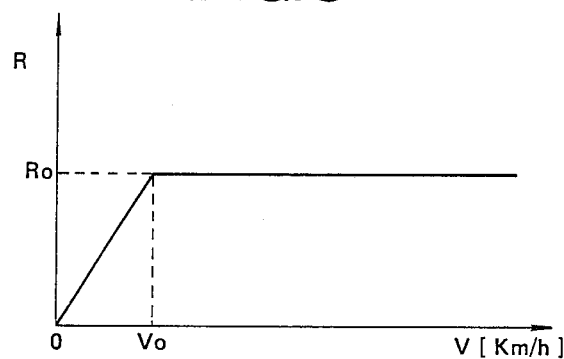
FIG. 8 is a graph showing relationship between gain control signal R and a vehicle speed.
Figure 9:
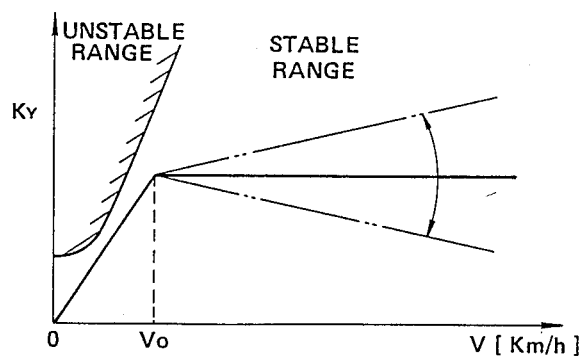
FIG. 9 is a graph showing relationship between vehicle speed and gain $K_y$.

The gain of the gain-controlled amplifier 116 is adjusted by the gain control signal R from the microprocessor 101. The gain control signal R may be a voltage signal having a voltage level representative of a desired gain in the gain-controlled amplifier 116. The gain-controlled amplifier 116 in the shown embodiment, is provided a gain variation characteristics to linearly vary the gain Ky according to variation of gain control signal value R, as shown in FIG. 7. Namely, as will be seen from FIG. 7, the gain Ky is a function (a×R: a is constant) of the gain control signal value R. On the other hand, the gain control signal value R is set in a form of table which is looked up in terms of the vehicle speed V. Variation characteristics of the gain control signal value R is experimentally determined and is designed to avoid unstable range where greater gain tends to cause self-induced lateral vibration, as shown in FIGS. 8 and 9. The saturation point $V_0$ across which gain control signal value R variation characteristics changes is experimentally determined. In practice, the saturation point $V_0$ is set approximately 10 km/h.

On the other hand, the longitudinal acceleration sensor 112, the gain-controlled amplifiers 120F and 120R and the adders 126FL, 126FR, 126RL and 126RR are so arranged to introduce pitching suppressing factor in the suspension control signals $S_{FL}$, $S_{FR}$, $S_{RL}$ and $S_{RR}$ to be output to the actuators. The gain of the gain-controlled amplifiers 120F and 120R are adjusted by gain control signals $E_f$ and $E_r$ produced by the microprocessor 101 and fed to respectively corresponding amplifier via D/A converters 130F and 130R. Since the pitching suppressive suspension control requires opposite control of suspension characteristics at front and rear suspension systems, polarity of inputs from the amplifiers 120F and 120R to the adders 126FL and 126FR are differentiated to that of the adders 126RL and 126RR. Therefore, when pitching suppressive suspension control is taken place to stiffen or harden front suspension systems, the rear suspension systems are controlled to soften the suspension characteristics, and when the front suspension systems are soften in pitching suppressive control, the rear suspension systems are harden.

The gain $K_f$ and $K_r$ of the gain-controlled amplifiers 120F and 120R are variable depending upon the gain control signals $E_f$ and $E_r$ input from the microprocessor 101 via the D/A converters 130F and 130R according the linear characteristics shown in FIG. 10. In the shown embodiment, the gain control signals $E_f$ and $E_r$ are variable of the levels depending upon the longitudinal acceleration Gx to be detected by the longitudinal acceleration sensor 112. Namely, when the longitudinal acceleration Gx is increased across zero, the gain control signal levels $E_f$ and $E_r$ increase by a given magnitude, as shown in FIG. 11(a). According to variation of the gain control signal level $E_f$ and $E_r$, the gains $K_f$ and $K_r$ of the gain-controlled amplifiers 120F and 120R varies correspondingly as shown in FIG. 11(b).

By controlling the gains $K_f$ and $K_r$ as set forth above and as illustrated in FIG. 11(b), the absolute value of gain $K_f$ which determines the pitching-suppressive suspension characteristics in the front suspension systems becomes greater than the absolute value of the gain $K_r$ which determines the pitching-suppressive suspension characteristics in the rear suspension systems during nose dive motion where the longitudinal acceleration is positive. On the other hand, during counter-action after nose dive, the absolute value of gain $K_r$ becomes greater than the absolute value of the gain $K_f$. This equalize the magnitude of pitching motion between the front and rear suspension systems. Therefore, suppression of nose dive can successfully achieved.

Figure 12:
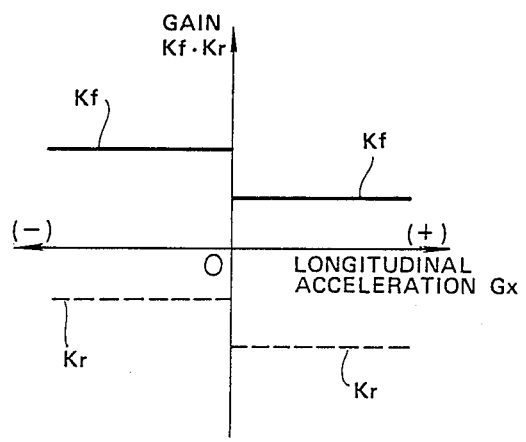
FIG. 12 is a graph showing another example of relationship between longitudinal acceleration $G_x$ and gains $K_f$ and $K_r$.

On the other hand, variation characteristics of the gains $K_f$ and $K_r$ can be modified as illustrated in FIG. 12. As will be seen from FIG. 12, the gain variation characteristics is alternated to that in FIG. 11(b). Such variation characteristics may be adapted for the vehicle having suspension characteristics to cause substantially winding-up during acceleration. Variation characteristics of the gains of the gain-controlled amplifiers 120F and 120R may not be specified to the shown characteristics and can be adjusted depending upon the vehicular suspension characteristics or attitude variation tendency.

Here, the fundamental idea of the present invention of rolling suppressive suspension control with avoidance of the self-induced lateral vibration will be discussed with reference to the model shown in FIG. 12. In the shown model, a vehicular body 80 as a sprung mass is suspended on a suspension arms 82 which constitute unsprung mass with vehicular wheel and suspension assembly. The lateral acceleration sensor 110 is mounted appropriate position on the vehicle body. The vertical acceleration sensors 114L and 114R are mounted at the top of respective suspension assembly. Lateral component of rolling energy which causing rolling motion of the vehicle is thus monitored by the lateral acceleration sensor 110. On the other hand, vertical component of the rolling energy is monitored by the vertical acceleration sensors 114L and 114R. The lateral acceleration indicative signal of the lateral acceleration sensor 110, which representative of the lateral component of the rolling energy, is amplified by a roll control gain Ky. On the other hand, the vertical acceleration indicative values of the vertical acceleration sensors 114L and 114R, which represents vertical component of the rolling energy, are amplified with a bounding control gains $K_3$. The amplified lateral acceleration indicative signal and the vertical acceleration indicative signals are added to derive roll suppressive suspension control signals $S_L$ and $S_R$. The value of the rolling suppressive control signals $S_L$ and $S_R$ are fed to hydraulic system H(s), i.e. the actuator 22.

Figure 13:
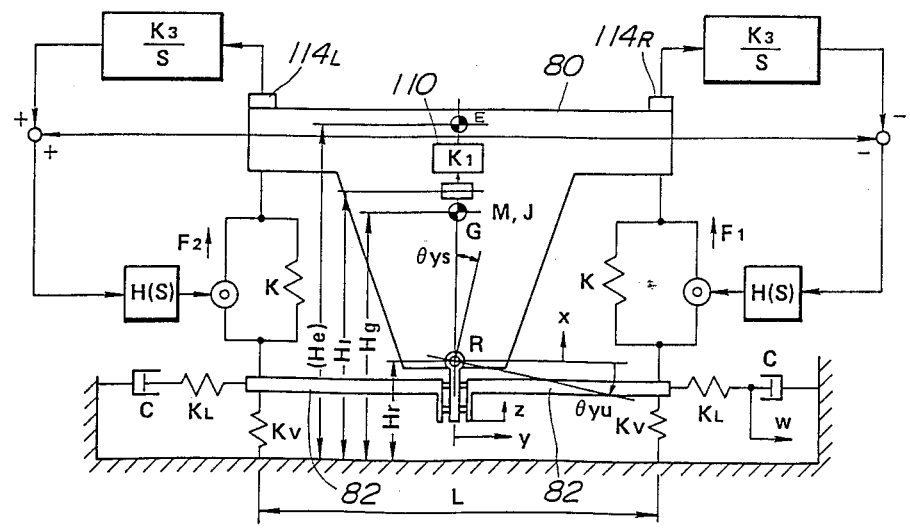
FIG. 13 is an illustration showing a model to be utilized for discussion about logic of anti-roll suspension control.

It is assumed that the condition of the model of FIG. 13 are as follows:

[SPECIFICATION]

M is a weight of sprung mass;
J is a rolling inertia moment;
K is a spring coefficient of suspension;
L is a treat;
Hr is a roll center height;
$H_9$ is a gravity center height
$K_L$ is a lateral strength of tire;
$K_V$ is a vertical strength of tire;
C is an equivalent absorption of cornering power of tire, which equivalent absorption represents cornering force of the tire and thus is variable depending upon the vehicle speed;

[CONSTANT]

$H_1$ is a height of the lateral acceleration sensor;

[VARIABLES]

$\theta_{ys}$ is a roll angle of the sprung mass;
$\theta_{yu}$ is a roll angle of the unsprung mass;
x is a vertical displacement of the sprung mass;
y is a lateral displacement of the sprung mass;
z is a vertical displacement of the unsprung mass;
w is a displacement of traction point.

The cornering force C of the tire can be illustrated by:

$$C = \theta_{SL} \times (V_1/V_2)$$

where
$\theta_{SL}$ is a slip angle;
$V_1$ is lateral motion speed;
$V_2$ is longitudinal rotation speed.

Figure 14:
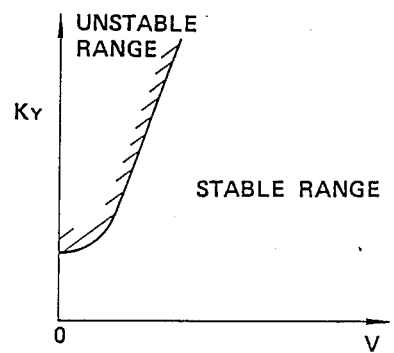
FIG. 14 is a chart showing stable and unstable regions of roll controlling gain $K_y$.

As will be appreciated, the value C becomes infinity ($\theta_{SL} \times 0/0$) while vehicle is stopping. The cornering force decreases from infinity according to increase of the vehicle speed. Therefore, in substantially low vehicle speed range, the cornering force of the tire is substantially great. Therefore, during substantially low vehicle speed range, vehicle is laterally supported merely by the cornering force C of the tire. In this vehicle speed range, when the rolling suppressive gain $K_1$ is substantially big, it tends to destroy left/right balance of the forces to cause self-induced lateral vibration in response to substantially small magnitude of lateral acceleration. This means the suspension condition of the vehicle in regard to the rolling stability, stability factor becomes smaller as increasing the rolling suppressive gain $K_1$. This unstable range is illustrated in FIG. 14.

On the other hand, since the cornering force C decreases according to increasing of the vehicle speed, vehicle becomes to be supported in lateral direction by a series system of the reduced cornering force C and the lateral strength $K_L$ of the tire. Therefore, stability factor increases as shown in FIG. 14.

Figure 15:
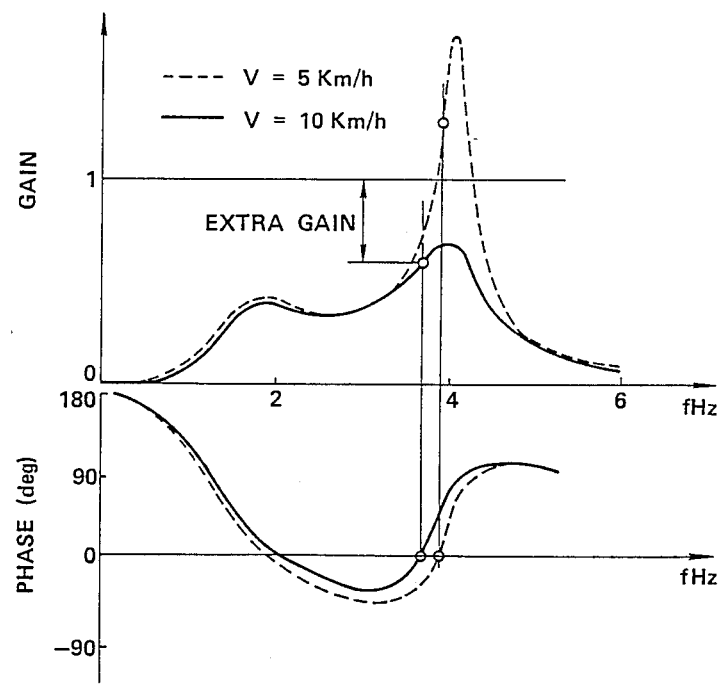
FIG. 15 a chart showing variation characteristics of frequency transmission coefficient in one cycle of anti-roll control.

In a condition where self-induced lateral vibration occurs, vibration frequency transmission coefficient for one cycle of vibration is monitored in a vehicle speed of 5 km/h and 10 km/h. The result of the measurement is shown in FIG. 15. As will be appreciated, the lateral suspension system is unstable at the vehicle speed of 5 km/h and becomes stable at the vehicle speed of 10 km/h.

Figure 16:
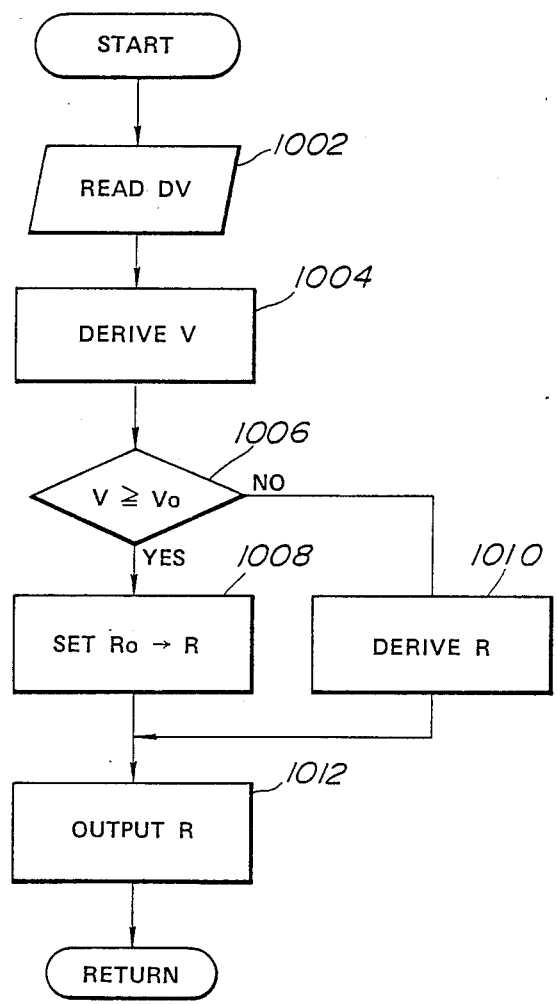
FIG. 16 is a flowchart showing a routine for adjusting roll-suppressive suspension characteristics control gain.

The hereafter discussed is the practical suspension control operation to perform roll-suppressive or anti-roll suspension control with reference to FIG. 16.

The shown routine is executed with a predetermined regular intervals, e.g. every 20 ms. Immediately after starting execution of the routine, the vehicle speed indicative signal DV is read and counted for a given period of time at a step 1002. The arithmetic circuit 102 is then active to calculate the vehicle speed data V on the basis of the counted number of pulses with the given period of time, at a step 1004.

In the alternative, the vehicle speed can also be derived by measuring the interval of pulses which is inversely proportional to the vehicle speed.

The vehicle speed data V derived at the step 1004 is compared with a preference data which corresponds to the predetermined vehicle speed $V_0$ across which variation characteristics of the gain of the gain-controlled amplifier 116 varies, at a step 1006. When the vehicle speed data V is greater than or equal to the $V_0$ representative reference data, the gain control signal value R is set at the value $R_0$ which is the constant value used while the vehicle speed is higher than the predetermined speed $V_0$, at a step 1008.

On the other hand, when the vehicle speed data V is smaller than the $V_0$ representative reference data as checked at the step 1004, the gain control signal value R is derived corresponding to the vehicle speed, at a step 1010. The control signal value R derived at the step 1010 is smaller than the gain control signal value $R_0$ derived at the step 1008. Namely, as will be seen from FIG. 8, the gain control value R as derived at the step 1010 varies within a range between zero to $R_0$ linearly corresponding to the vehicle speed, i.e. zero to $V_0$.

After one of the steps 1008 and 1010, process goes to a step 1012 to output a gain control signal R to the gain-controlled amplifier 116.

Therefore, response characteristics of anti-roll suspension control in substantially low vehicle speed range is substantially lowered than that in relatively high vehicle speed range. This successfully suppress self-induced lateral vibration of the vehicle to assure riding comfort at low vehicle speed range. On the other hand, since the self-induced lateral vibration can be thus successfully prevented, satisfactorily high response characteristics of anti-roll suspension control can be provided in relatively vehicle speed range. Therefore, the shown embodiment of the suspension control system may provide substantially high roll stability without degrading riding comfort at substantially low vehicle speed range.

Figure 17:
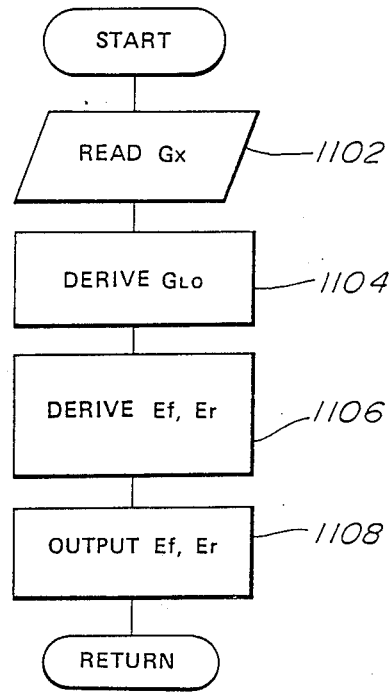
FIG. 17 is a flowchart showing a routine for adjusting pitching-suppressive suspension characteristics control gain.

On the other hand, adjustment of pitching suppressive suspension control is performed according to the routine of FIG. 17. The routine of FIG. 17 is also triggered with a given constant interval, e.g. 20 ms.

Immediately after starting execution, the longitudinal acceleration indicative signal value Gx is read at a step 1102. Based on the read longitudinal acceleration indicative signal value Gx, longitudinal acceleration value $G_{LOG}$ is derived at a step 1104. Based on the longitudinal acceleration value $G_{LOG}$ derived at the step 1104, the gain control signal values $E_f$ and $E_r$ are derived according to the characteristics illustrated in FIGS. 11(a) and 11(b), at a step 1106. The gain control signals $E_f$ and $E_r$ for the gain-controlled amplifiers 120F and 120R derived at the step 1106, are output at a step 1108.

Since the pitching-suppressive suspension control characteristics can be adjusted by setting the characteristics of variation of the gains of the gain-controlled amplifiers 120F and 120R adapted to the suspension characteristics of the vehicle, appropriate attitude control for the vehicular suspension system can be provided.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims. Namely, though the discussion given hereabove is directed to hydraulic cylinder and hydraulic circuit for producing damping force for controlling suspension characteristics in the actively controlled suspension system according to the invention, it should be possible to apply the same logic in roll-suppressive and/or pitching suppressive suspension control for hydropneumatic suspension, pneumatic suspension and so forth. Furthermore, though the shown embodiment discloses the suspension control system which perform both of roll-suppressive and pitching-suppressive control, it is construct the suspension system to perform only roll-suppressive control.

What is claimed is:

1. An anti-roll suspension control system for an automotive vehicle comprising:
    a suspension system disposed between a vehicle body and a suspension member which rotatably supports a vehicular wheel, said suspension system having a variable pressure chamber filled with a working fluid of controlled pressure;
    a pressure adjusting means, associated with said variable pressure chamber, for adjusting the pressure of said working fluid in said pressure chamber;
    a first sensor means for monitoring the vehicle speed to producing a vehicle speed indicative signal indicative of the vehicle speed;
    a second sensor means for monitoring vehicular rolling condition for producing a rolling magnitude indicative signal; and
    a control unit receiving said vehicle speed indicative signal and said rolling magnitude indicative signal, producing an anti-roll suspension control signal based on said rolling magnitude indicative signal to control said pressure adjusting means for adjusting suspension characteristics to suppress vehicular rolling, said control unit adjusting response characteristics of anti-roll suspension control in response to said rolling magnitude indicative signal depending upon said vehicle speed indicative signal value.

2. An anti-roll suspension control system as set forth in claim 1, wherein said control unit detects said vehicle speed indicative signal value smaller than a given value to lower said response characteristics.

3. An anti-roll suspension control system as set forth in claim 2, wherein said control unit maintains said response characteristics at a give constant first level while said vehicle speed indicative signal value is held greater than or equal to said give value.

4. An anti-roll suspension control system as set forth in claim 3, wherein said control unit is responsive to vary said response characteristics between said first level and zero level according to the vehicle speed indicative signal value while said vehicle speed indicative signal value is held lower than said given value.

5. An anti-roll suspension control system as set forth in claim 2 wherein said control unit is set said given value at a value representative of substantially low vehicle speed.

6. An anti-roll suspension control system as set forth in claim 1, wherein said pressure adjusting means comprises a pressurized fluid source connected to said variable pressure chamber and a pressure control valve incorporating an electrically operable actuator, said actuator being connected to said control unit to receive said anti-roll suspension control signal to operate said pressure control valve for adjusting amount of working fluid to be introduced into and removed from said variable pressure chamber for adjusting damping characteristics of said suspension system.

7. An anti-roll suspension control system as set forth in claim 6, wherein said control unit includes a gain-controlled amplifier which determines said response characteristics, said control unit adjusts the gain of said gain-controlled amplifier corresponding to said vehicle speed indicative signal value.

8. An anti-roll suspension control system as set forth in claim 7, wherein said control unit compares said vehicle speed indicative signal value with a predetermined low vehicle speed criterion to maintain said gain of said gain-controlled amplifier at a constant first value when said vehicle speed indicative signal value is greater than or equal to said low vehicle speed criterion, and lowers said gain corresponding to said vehicle speed indicative signal value which is smaller than said low vehicle speed criterion.

9. An anti-roll suspension control system as set forth in claim 8, wherein said control unit varies said gain of said gain-controlled amplifier in a range between said first value and zero value depending upon the vehicle speed indicative signal value.

10. An anti-roll suspension control system as set forth in claim 9, wherein said control unit varies said gain of said gain-controlled amplifier linearly corresponding to said vehicle speed indicative signal value.

11. An anti-roll suspension control system for an automotive vehicle comprising:
   at least first-left and second-right suspension systems, each being disposed between a vehicle body and a suspension member which rotatably supports a vehicular wheel, each of said suspension system having a variable pressure chamber filled with a working fluid of controlled pressure;
   a pressure adjusting means, associated with said variable pressure chambers, for adjusting the pressure of said working fluid in said pressure chambers in a manner mutually independent to the other;
   a first sensor means for monitoring the vehicle speed to producing a vehicle speed indicative signal indicative of the vehicle speed;
   a second sensor means for monitoring vehicular rolling condition for producing a rolling magnitude indicative signal; and
   a control unit receiving said vehicle speed indicative signal and said rolling magnitude indicative signal, producing first and second anti-roll suspension control signals based on said rolling magnitude indicative signal to control said pressure adjusting means for adjusting suspension characteristics in said first and second suspension systems to suppress vehicular rolling, said control unit adjusting response characteristics of anti-roll suspension control in response to said rolling magnitude indicative signal depending upon said vehicle speed indicative signal value.

12. An anti-roll suspension control system as set forth in claim 1, wherein said control unit detects said vehicle speed indicative signal value smaller than a given value to lower said response characteristics.

13. An anti-roll suspension control system as set forth in claim 12, wherein said control unit maintains said response characteristics at a give constant first level while said vehicle speed indicative signal value is held greater than or equal to said give value.

14. An anti-roll suspension control system as set forth in claim 13, wherein said control unit is responsive to vary said response characteristics between said first level and zero level according to the vehicle speed indicative signal value while said vehicle speed indicative signal value is held lower than said given value.

15. An anti-roll suspension control system as set forth in claim 12, wherein said control unit is set said given value at a value representative of substantially low vehicle speed.

16. An anti-roll suspension control system as set forth in claim 11, wherein said pressure adjusting means comprises a pressurized fluid source connected to said variable pressure chambers via first and second pressure control lines and first pressure control valves respectively incorporating an electrically operable actuators, each of said actuator being connected to said control unit to receive one of said first and second said anti-roll suspension control signal to operate corresponding one of said pressure control valve for adjusting amount of working fluid to be introduced into and removed from said variable pressure chamber for adjusting damping characteristics of the corresponding one of first and second suspension systems.

17. An anti-roll suspension control system as set forth in claim 16, wherein said control unit includes a gain-controlled amplifier which determines said response characteristics, said control unit adjusts the gain of said gain-controlled amplifier corresponding to said vehicle speed indicative signal value.

18. An anti-roll suspension control system as set forth in claim 17, wherein said control unit compares said vehicle speed indicative signal value with a predetermined low vehicle speed criterion to maintain said gain of said gain-controlled amplifier at a constant first value when said vehicle speed indicative signal value is greater than or equal to said low vehicle speed criterion, and lowers said gain corresponding to said vehicle speed indicative signal value which is smaller than said low vehicle speed criterion.

19. An anti-roll suspension control system as set forth in claim 18, wherein said control unit varies said gain of said gain-controlled amplifier in a range between said first value and zero value depending upon the vehicle speed indicative signal value.

20. An anti-roll suspension control system as set forth in claim 19, wherein said control unit varies said gain of said gain-controlled amplifier linearly corresponding to said vehicle speed indicative signal value.

21. An anti-roll suspension control system as set forth in claim 11, which further comprises third and fourth sensors respectively arranged in the vicinity of said first and second suspension systems for monitoring bouncing magnitude to produce first and second bouncing magnitude indicative signals, and said control unit receives said first and second bouncing magnitude indicative signals to derive said anti-roll suspension control signal on the basis of said first and second bouncing magnitude indicative signals and said rolling magnitude indicative signal.

22. An actively controlled suspension system for an automotive vehicle comprising:
   a suspension system disposed between a vehicle body and a suspension member which rotatably supports a vehicular wheel, said suspension system having a variable pressure chamber filled with a working fluid of controlled pressure;

a pressure adjusting means, associated with said variable pressure chamber, for adjusting the pressure of said working fluid in said pressure chamber;

a first sensor means for monitoring magnitude of relative displacement between said vehicle body and said suspension member to produce a bouncing magnitude indicative signal;

a second sensor means for monitoring vehicular rolling condition for producing a rolling magnitude indicative signal; and a third sensor means for monitoring the vehicle speed to producing a vehicle speed indicative signal indicative of the vehicle speed;

a control unit receiving said bouncing magnitude indicative signal, said rolling magnitude indicative signal and said vehicle speed indicative signal, producing a suspension control signal based on said bouncing magnitude indicative signal value to control said pressure adjusting means for adjusting suspension characteristics to suppress relative displacement between said vehicle body and said suspension member, said control unit being responsive to rolling magnitude indicative signal to modify said suspension control signal for suppressing vehicular rolling, said control unit adjusting response characteristics of anti-roll suspension control in response to said rolling magnitude indicative signal depending upon said vehicle speed indicative signal value.

23. An anti-roll suspension control system as set forth in claim 22, wherein said control unit detects said vehicle speed indicative signal value smaller than a given value to lower said response characteristics.

24. An anti-roll suspension control system as set forth in claim 23, wherein said control unit maintains said response characteristics at a give constant first level while said vehicle speed indicative signal value is held greater than or equal to said give value.

25. An anti-roll suspension control system as set forth in claim 24, wherein said control unit is responsive to vary said response characteristics between said first level and zero level according to the vehicle speed indicative signal value while said vehicle speed indicative signal value is held lower than said given value.

26. An anti-roll suspension control system as set forth in claim 23, wherein said control unit is set said given value at a value representative of substantially low vehicle speed.

27. An anti-roll suspension control system as set forth in claim 22, wherein said pressure adjusting means comprises a pressurized fluid source connected to said variable pressure chamber and a pressure control valve incorporating an electrically operable actuator, said actuator being connected to said control unit to receive said anti-roll suspension control signal to operate said pressure control valve for adjusting amount of working fluid to be introduced into and removed from said variable pressure chamber for adjusting damping characteristics of said suspension system.

28. An anti-roll suspension control system as set forth in claim 27, wherein said control unit includes a gain-controlled amplifier which determines said response characteristics, said control unit adjusts the gain of said gain-controlled amplifier corresponding to said vehicle speed indicative signal value.

29. An anti-roll suspension control system as set forth in claim 28, wherein said control unit compares said vehicle speed indicative signal value with a predetermined low vehicle speed criterion to maintain said gain of said gain-controlled amplifier at a constant first value when said vehicle speed indicative signal value is greater than or equal to said low vehicle speed criterion, and lowers said gain corresponding to said vehicle speed indicative signal value which is smaller than said low vehicle speed criterion.

30. An anti-roll suspension control system as set forth in claim 29, wherein said control unit varies said gain of said gain-controlled amplifier in a range between said first value and zero value depending upon the vehicle speed indicative signal value.

31. An anti-roll suspension control system as set forth in claim 30, wherein said control unit varies said gain of said gain-controlled amplifier linearly corresponding to said vehicle speed indicative signal value.

* * * * *